(12) United States Patent
Zhang et al.

(10) Patent No.: US 10,574,870 B2
(45) Date of Patent: Feb. 25, 2020

(54) LENS MODULE COMPRISING AN IMAGE SENSOR MOUNTED IN THE RECEIVING GROOVE OF A CIRCUIT BOARD WITH ELECTRONIC COMPONENTS AND METHOD FOR ASSEMBLING THE SAME

(71) Applicants: TRIPLE WIN TECHNOLOGY(SHENZHEN) CO.LTD., Shenzhen (CN); HON HAI PRECISION INDUSTRY CO., LTD., New Taipei (TW)

(72) Inventors: Long-Fei Zhang, Shenzhen (CN); Shin-Wen Chen, New Taipei (TW); Kun Li, Shenzhen (CN); Xiao-Mei Ma, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 52 days.

(21) Appl. No.: 16/040,855

(22) Filed: Jul. 20, 2018

(65) Prior Publication Data

US 2019/0387142 A1    Dec. 19, 2019

(30) Foreign Application Priority Data

Jun. 15, 2018    (CN) .......................... 2018 1 0622857

(51) Int. Cl.
  *H04N 5/225*    (2006.01)
  *G02B 7/00*    (2006.01)
  *G02B 7/02*    (2006.01)

(52) U.S. Cl.
  CPC ........... *H04N 5/2254* (2013.01); *G02B 7/005* (2013.01); *G02B 7/026* (2013.01)

(58) Field of Classification Search
  CPC ........ G02B 27/0955; G02B 5/20; G02B 7/02; H04N 5/2253; H04N 5/2254
  USPC ..................................... 250/239, 208.1, 216
  See application file for complete search history.

(56) References Cited

U.S. PATENT DOCUMENTS 10,473,886 B2 * 11/2019 Park ................... H02K 41/0356

FOREIGN PATENT DOCUMENTS

TW        201814895 A    4/2018

* cited by examiner

*Primary Examiner* — Que Tan Le
(74) *Attorney, Agent, or Firm* — ScienBiziP, P.C.

(57) ABSTRACT

A lens module with compact appearance includes a circuit board, an image sensor, a package bracket, an optical filter, and a lens unit. The circuit board defines a first receiving groove for receiving the image sensor. The circuit board has electronic components and gold fingers on one surface. Metallic wires are arranged on edges of a surface of the image sensor. The package bracket is integrally formed on the circuit board to wrap the electronic components, the gold fingers, and the metallic wires therein. The optical filter is connected to surface of the package bracket facing away from the circuit board. The lens unit includes a hollow lens holder and a lens mounted in the lens holder. The lens holder is connected to the surface of the mounting frame facing away from the circuit board.

11 Claims, 5 Drawing Sheets

LENS MODULE COMPRISING AN IMAGE SENSOR MOUNTED IN THE RECEIVING GROOVE OF A CIRCUIT BOARD WITH ELECTRONIC COMPONENTS AND METHOD FOR ASSEMBLING THE SAME

FIELD

The subject matter relates to imaging devices.

BACKGROUND

Many portable electronic devices, such as cell phones, tablet computers, and multimedia players, usually include lens modules. The lens module needs to be designed to have a compact appearance to allow the portable electronic device to have a smaller size.

Therefore there is room for improvement within the art.

BRIEF DESCRIPTION OF THE DRAWINGS

Implementations of the present technology will now be described, by way of example only, with reference to the attached figures.

DETAILED DESCRIPTION

Figure 1:
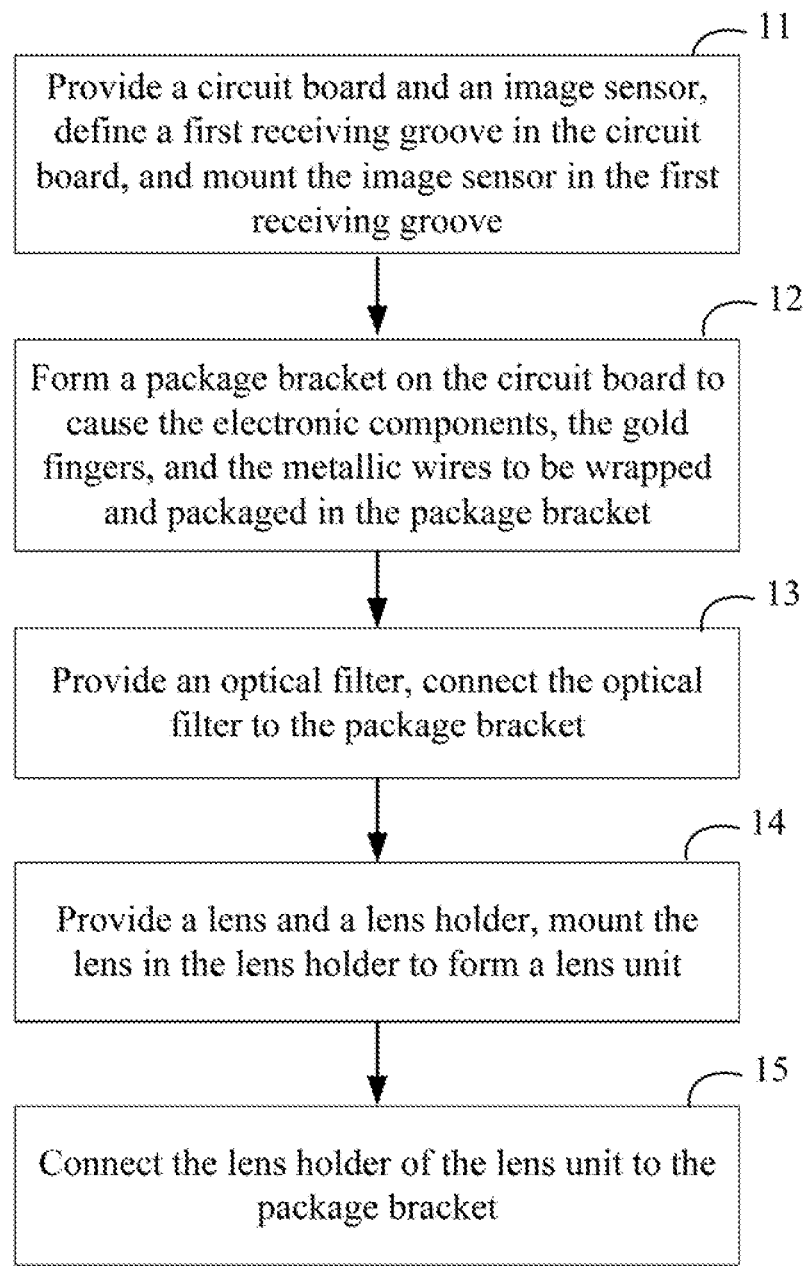
FIG. 1 is a flowchart of an embodiment of a method for assembling a lens module.
Figure 2:
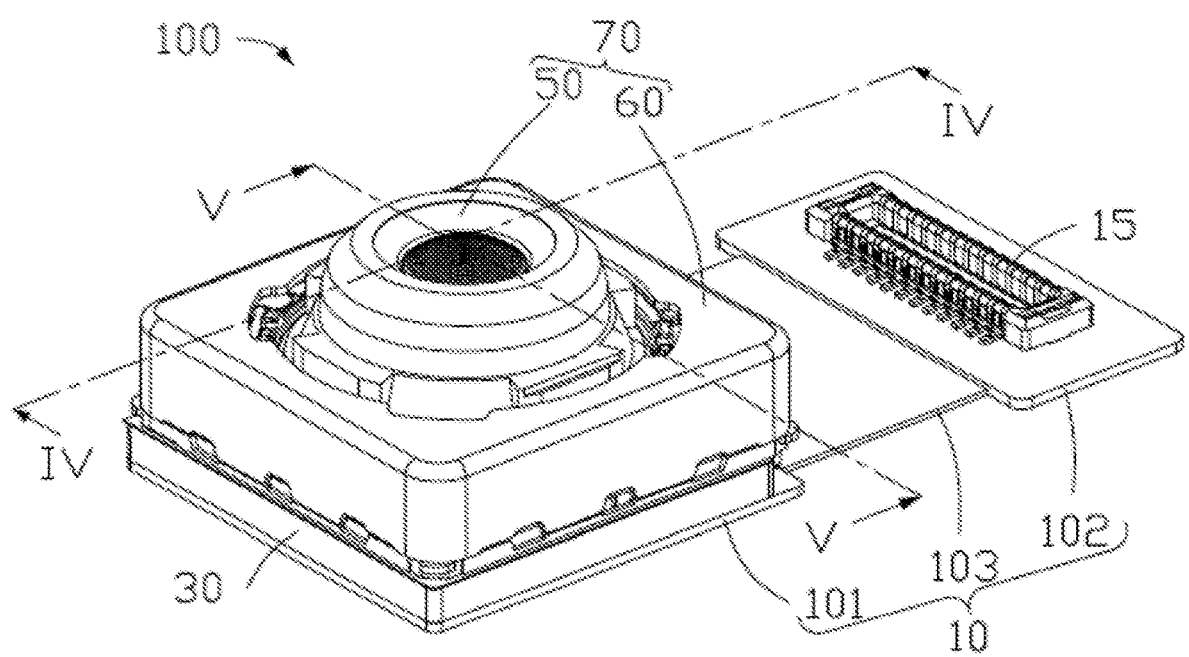
FIG. 2 is a diagrammatic view of an embodiment of a lens module.
Figure 3:
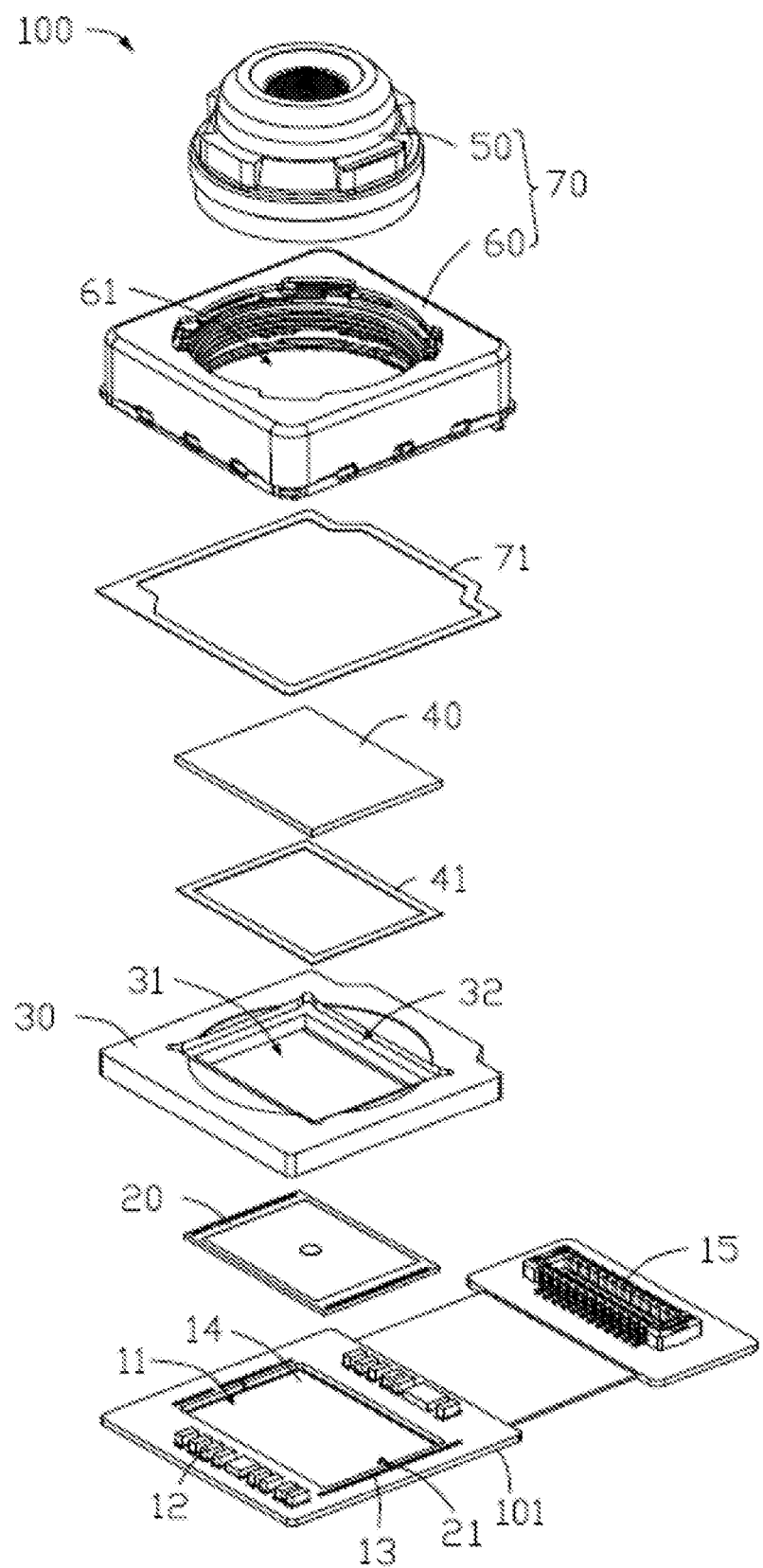
FIG. 3 is an exploded diagram of the lens module of FIG. 2.
Figure 4:
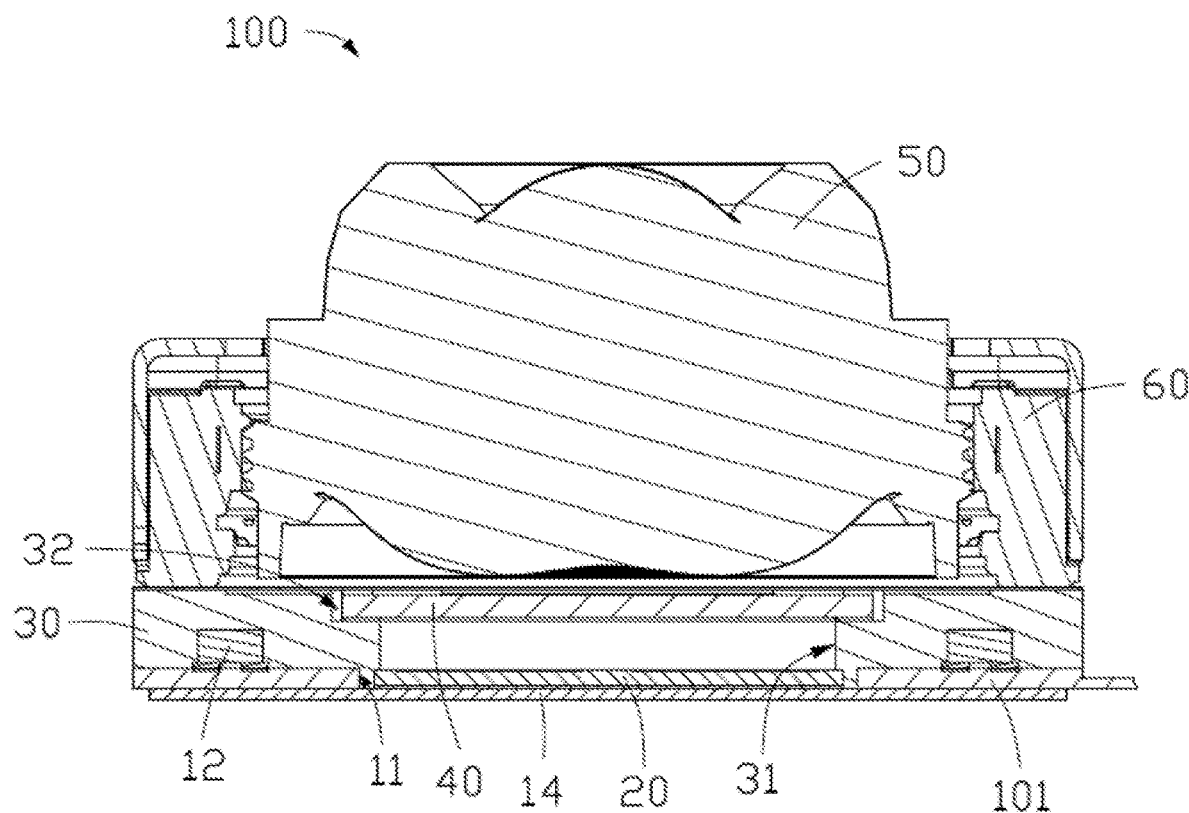
FIG. 4 is a cross-sectional view taken along line IV-IV of FIG. 2.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates an embodiment of a method for assembling a lens module. The method is provided by way of example, as there are a variety of ways to carry out the method. Each block shown in FIG. 1 represents one or more processes, methods, or subroutines, carried out in the example method. Furthermore, the illustrated order of blocks is illustrative only and the order of the blocks can be changed. Additional blocks can be added or fewer blocks may be utilized, without departing from this disclosure. The example method can begin at block 11.

At block 11, a circuit board 10 and an image sensor 20 are provided. A first receiving groove 11 is defined in the circuit board 10. The image sensor 20 is received and mounted in the first receiving groove 11.

In an embodiment, the circuit board 10 is a ceramic substrate, a rigid circuit board, a flexible circuit board, or a rigid-flexible circuit board. In an embodiment, the circuit board 10 is a rigid-flexible circuit board that comprises a first rigid board portion 101, a second rigid board portion 102, and a flexible board portion 103 positioned between the first rigid board portion 101 and the second rigid board portion 102. The first rigid board portion 101 has electronic components 12 and gold fingers 13 on one surface. The electronic components 12 can be resistances, capacitors, diodes, triodes, relays, or electrically erasable programmable read only memories (EEPROMs). The second rigid board portion 12 has a connector 15 on one surface. The connector 15, the electronic components 12, and the gold fingers 13 can be on the same surface of the circuit board 10. The circuit board 10 can support the electronic components 12 and provide connections for the electronic components 12.

In an embodiment, to increase the mounting stability of the image sensor 20, a support plate 14 is mounted on another surface of the circuit board 10 facing away from the electronic components 12 and the gold fingers 13. The support plate 14 closes an end of the first receiving groove 11 to cause the image sensor 20 to connect to the circuit board 10 through the support plate 14. The support plate 14 can be made of steel.

The gold fingers 13 surround the image sensor 20. After the image sensor 20 is mounted in the first receiving groove 11, metallic wires 21 can be arranged on edges of a surface of the image sensor 20 facing away from the support plate 14, to cause the metallic wires 21 to match and electrically connect to the gold fingers 13. The metallic wires 21 can be made of metal having good conductivity, such as gold (Au). In an embodiment, the image sensor 20 can be a Complementary Metal Oxide Semiconductor (CMOS) sensor or a Charge Coupled Device (CCD) sensor.

At block 12, a package bracket 30 is formed on the surface of the circuit board 10 (for example, the first rigid board portion 101) having the electronic components 12 and the gold fingers 13 through a molding process, to cause the package bracket 30 to be integrally formed on the circuit board 10, and to cause the electronic components 12, the gold fingers 13, and the metallic wires 21 to be wrapped and packaged in the package bracket 30.

Figure 5:
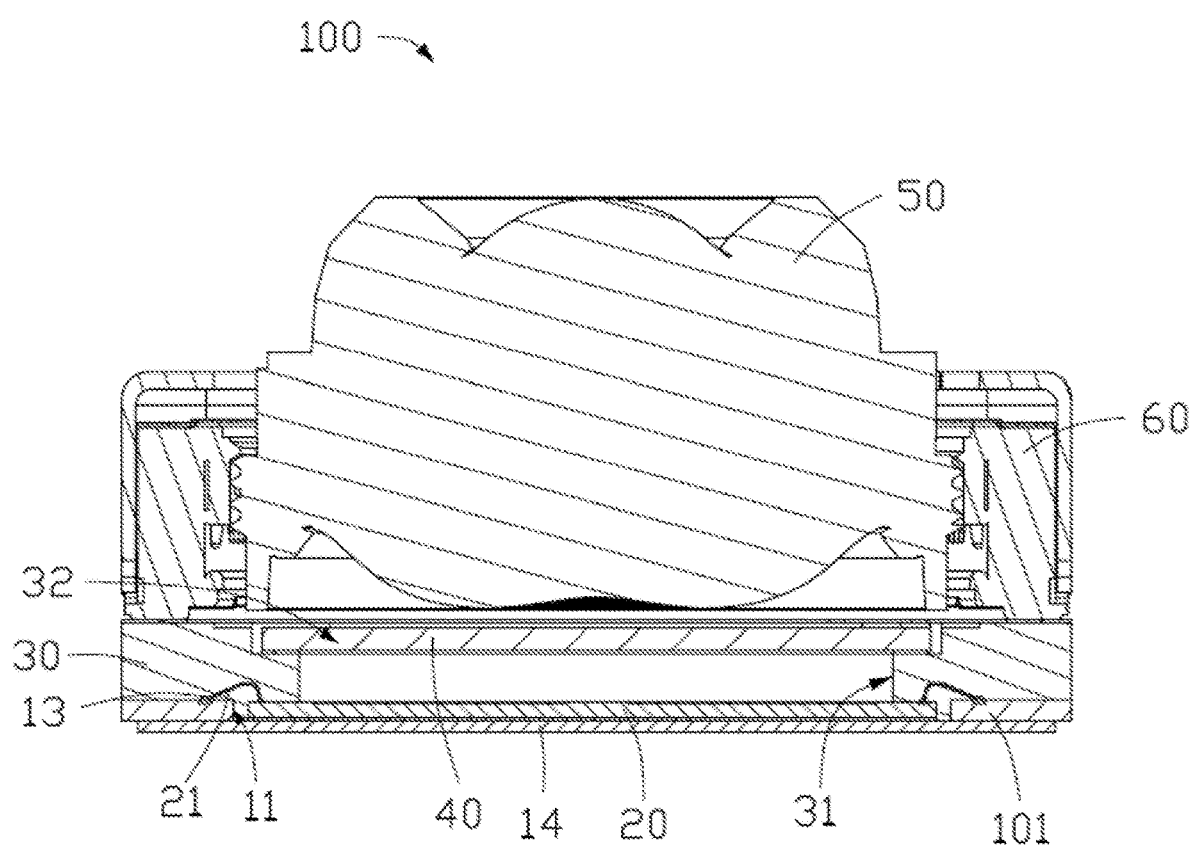
FIG. 5 is a cross-sectional view taken along line V-V of FIG. 2.

In an embodiment, the package bracket 30 can be made of a material selected from polyamide, liquid crystal polymer (LCP), and polypropylene (PP). The molding process can be an injection molding process or a mold pressing process. The package bracket 30 is substantially square, and defines a second receiving groove 31. Referring to FIG. 5, a lateral width of the second receiving groove 31 is less than a lateral width of the image sensor 20, thereby causing the package bracket 30 to cover the edges of the image sensor 20 having the metallic wires 21 and to wrap and package the metallic wires 21 in the package bracket 30. A remaining portion of the image sensor 20 besides the edges is exposed from the second receiving groove 31 to form an image sensing area.

At block 13, an optical filter 40 is provided. The optical filter 40 is glued to a surface of the package bracket 30 facing away from the circuit board 10 through a first adhesive layer 41, to position the optical filter 40 above the image sensor 20.

In an embodiment, the surface of the package bracket 30 facing away from the circuit board 10 is recessed around the second receiving groove 31 to form a recessed groove 32. The optical filter 40 is glued on the recessed groove 32 to cause the optical filter 40 to be substantially flush with the package bracket 30. The first adhesive layer 41 can be made of optical clear adhesive (OCA).

In an embodiment, the optical filter 40 can be an IR cut-off filter that can remove infrared light from light beams.

At block 14, a lens 50 and a lens holder 60 are provided. The lens 50 is mounted in the lens holder 60 to form a lens unit 70.

In an embodiment, the lens 50 can be made of resin. The lens holder 60 can be a voice coil motor (VCM), and comprises a through hole 61. The lens 50 is mounted in the through hole 61 of the lens holder 60.

At block 15, the lens holder 60 of the lens unit 70 is glued on the surface of the package bracket 30 facing away from the circuit board 10 through a second adhesive layer 71, to position the lens 50 above the image sensor 20, thereby obtaining the lens module 100.

The second adhesive layer 71 can be made of OCA.

FIGS. 2 to 5 illustrate an embodiment of a lens module 100. The lens module 100 can be used in an electronic device, such as a smart phone, a tablet computer, or a personal digital assistant (PDA). The lens module 100 comprises a circuit board 10, an image sensor 20, a hollow package bracket 30, an optical filter 40, and a lens unit 70.

A first receiving groove 11 is defined in the circuit board 10. The image sensor 20 is received and mounted in the first receiving groove 11. The circuit board 10 has electronic components 12 and gold fingers 13 on one surface. Edges of a surface of the image sensor 20 have metallic wires 21 that match and electrically connect to the gold fingers 13.

The package bracket 30 is integrally formed on the surface of the circuit board 10 having the electronic components 12 and the gold fingers 13 through a molding process. The electronic components 12, the gold fingers 13, and the metallic wires 21 are wrapped and packaged in the package bracket 30.

The optical filter 40 is glued to a surface of the package bracket 30 facing away from the circuit board 10, to position the optical filter 40 above the image sensor 20.

The lens unit 70 comprises a lens 50 and a lens holder 60. The lens 50 is mounted in the lens holder 60. The lens holder 60 of the lens unit 70 is glued on a surface of the package bracket 30 facing away from the circuit board 10 to position the lens 50 above the image sensor 20.

When in use, the optical filter 40 removes infrared light from the light beams passing through the lens 50. The image sensor 20 converts the light beams to electrical signals, and outputs the electrical signals to the circuit board 10. The circuit board 10 processes the electrical signals to form images. The lens module 100 can be mounted to other components (not shown) of the electronic device through the connector 11.

With the above configuration, instead of mounting the image sensor 20 on the circuit board 10, the image sensor 20 is mounted in the first receiving groove 11 of the circuit board 10 to decrease the height of the lens module 100. Furthermore, the electronic components 12, the gold fingers 13, and the metallic wires 21 are wrapped and packaged in the package bracket 30. Thus, the package bracket 30 can be formed inward on the circuit board 10 (that is, the lateral width of the package bracket 30 can be decreased), thereby decreasing the lateral width of the lens module 100. That is, the total size of the lens module 100 can be decreased. Moreover, the package bracket 30 wrapping the electronic components 12 therein can prevent dust and other contaminants from falling on and polluting the electronic components 12. Finally, since the lateral width of the package bracket 30 is decreased, the lateral width of the optical filter 40 mounted on the package bracket 30 can also be decreased.

Depending on the embodiment, certain of the steps of method hereinbefore described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A method for assembling a lens module, comprising:
providing a circuit board and an image sensor, defining a first receiving groove in the circuit board, and mounting the image sensor in the first receiving groove, the circuit board having electronic components and gold fingers on one surface, edges of a surface of the image sensor having metallic wires which match and electrically connect to the gold fingers;
forming a package bracket on the surface of the circuit board having the electronic components and the gold fingers through a molding process, to cause the package bracket to be integrally formed on the circuit board, and to cause the electronic components, the gold fingers, and the metallic wires to be wrapped and packaged in the package bracket;
providing an optical filter, connecting the optical filter on a surface of the package bracket facing away from the circuit board, to position the optical filter above the image sensor;
providing a lens and a lens holder, mounting the lens in the lens holder to form a lens unit; and
connecting the lens holder of the lens unit to the surface of the package bracket facing away from the circuit board to position the lens above the image sensor.

2. The method of claim 1, wherein the circuit board comprises a first rigid board portion, a second rigid board portion, and a flexible board portion positioned between the first rigid board portion and the second rigid board portion, the electronic components and the gold fingers are mounted on a surface of the first rigid board portion, the second rigid board portion has a connector on one surface, the package bracket is formed on the surface of the first rigid board portion having the electronic components and the gold fingers.

3. The method of claim 1, wherein a support plate is mounted on another surface of the circuit board facing away from the electronic components and the gold fingers, the support plate closes an end of the first receiving groove to cause the image sensor to connect to the circuit board through the support plate.

4. The method of claim 1, wherein the package bracket defines a second receiving groove, a lateral width of the second receiving groove is less than a lateral width of the image sensor, thereby causing the package bracket to cover the edges of the image sensor having the metallic wires and to wrap and package the metallic wires in the package bracket, a remaining portion of the image sensor besides the edges is exposed from the second receiving groove to form an image sensing area.

5. The method of claim 4, wherein the surface of the package bracket facing away from the circuit board is recessed around the second receiving groove to form a recessed groove, the optical filter is mounted on the recessed groove to cause the optical filter to be flush with the package bracket.

6. A lens module comprising:
- a circuit board defining a first receiving groove, the circuit board having electronic components and gold fingers on one surface;
- an image sensor received and mounted in the first receiving groove, edges of a surface of the image sensor having metallic wires which match and electrically connect to the gold fingers;
- a package bracket integrally formed on the surface of the circuit board having the electronic components and the gold fingers, the electronic components, the gold fingers, and the metallic wires wrapped and packaged in the package bracket;
- an optical filter connected to surface of the package bracket facing away from the circuit board, to position the optical filter above the image sensor; and
- a lens unit comprising a hollow lens holder and a lens mounted in the lens holder, the lens holder of the lens unit connected to the surface of the package bracket facing away from the circuit board to position the lens above the image sensor.

7. The lens module of claim 6, wherein the circuit board comprises a first rigid board portion, a second rigid board portion, and a flexible board portion positioned between the first rigid board portion and the second rigid board portion, the electronic components and the gold fingers are mounted on a surface of the first rigid board portion, the second rigid board portion has a connector on one surface, the package bracket is formed on the surface of the first rigid board portion having the electronic components and the gold fingers.

8. The lens module of claim 6, wherein a support plate is mounted on another surface of the circuit board facing away from the electronic components and the gold fingers, the support plate closes an end of the first receiving groove to cause the image sensor to connect to the circuit board through the support plate.

9. The lens module of claim 6, wherein the package bracket defines a second receiving groove, a lateral width of the second receiving groove is less than a lateral width of the image sensor, thereby causing the package bracket to cover the edges of the image sensor having the metallic wires and to wrap and package the metallic wires in the package bracket, a remaining portion of the image sensor besides the edges is exposed from the second receiving groove to form an image sensing area.

10. The lens module of claim 6, wherein the surface of the package bracket facing away from the circuit board is recessed around the second receiving groove to form a recessed groove, the optical filter is mounted on the recessed groove to cause the optical filter to be flush with the package bracket.

11. The lens module of claim 6, wherein the package bracket is made of a material selected from polyamide, liquid crystal polymer, and polypropylene.

* * * * *